Patented Oct. 12, 1937

2,095,524

UNITED STATES PATENT OFFICE 2,095,524

CELLULOSE DERIVATIVES AND PROCESS FOR MAKING SAME

Leon Lilienfeld, Vienna, Austria

No Drawing. Application March 7, 1931, Serial No. 521,026. In Great Britain March 14, 1930

17 Claims. (Cl. 260—152)

The present invention is based on the observation that technically valuable cellulose compounds can be obtained by acting with a halogen-olefine upon cellulose in presence of a basic substance, particularly an alkali.

Some of the products obtainable according to the present invention are soluble in caustic alkali solution, but insoluble in water and may be precipitated from their solutions in an alkali by neutralizing or acidifying the solution. The alkaline solutions of such products of the present invention as are soluble in alkali solutions yield, if brought into a suitable form and treated with an appropriate precipitating agent, such as an acid, a salt, an acid and a salt, an acid salt, an alcohol or the like, transparent products such as films, threads and the like, which, after washing and drying, are solid and flexible. The new cellulose derivatives may be worked up either alone, or mixed with other colloids or binding agents which are soluble in water or in aqueous alkali, into a whole series of industrial products, such as artificial fibres (for instance, artificial silk), films, plates, plastic substances, coatings and layers of every description, fabric dressings insoluble in water, sizing for spun materials, thickening agents for textile printing, fixing agents for pigments, binding materials, book cloth and the like.

The process may be carried out in a very simple manner. It consists essentially in treating bleached or unbleached cellulose, or a substance containing cellulose, or a conversion product of cellulose in the presence of an alkali with a halogenolefine in undiluted or diluted state.

The alkali may be added either by steeping the cellulose in an excess of a solution of alkali and removing the excess of alkali solution by pressing, centrifuging or the like, or by mixing or kneading the cellulose with the required quantity of caustic alkali solution, or by mixing or kneading the cellulose or alkali cellulose with solid caustic alkali, or with a mixture of solid caustic alkali with a saturated alkali solution.

The reaction mixture after the reaction with the halogenolefine is completed, may be treated for instance by dissolving it by adding water (if a sufficient excess of unused alkali remains) or by adding dilute alkali solution (for instance, a caustic soda solution of 3–10 per cent. strength) and using for technical purposes the solution or paste so obtained if necessary after previously removing any undissolved substance present by straining or filtering or the like. The product, however, may also be separated from the reaction mixture in various ways. For instance, the two following methods may be mentioned: The reaction mixture, optionally after neutralizing the free alkali or after acidifying (especially when there is present a large amount of free alkali), is washed with water and the residue dried, if desired, after previously dehydrating it with alcohol. Or the reaction mixture may be dissolved by adding water or dilute alkali solution and the solution of the cellulose derivative, if necessary, filtered, strained or centrifuged, and treated with an acid or with any other agent capable of fixing the alkali (for instance, an ammonium salt) in sufficient quantity for complete precipitation of the product, or in excess; the precipitate is then thoroughly washed with water and, if desired, dried. The substance however isolated may be purified by dissolving it in alkali and precipitating it by means of an acid or the like.

The carrying out of the process is illustrated by the following examples to which, however, the invention is in no way limited.

The parts are by weight.

*Example 1.*—2000 parts of a matured or non-matured alkali cellulose containing about 1000 parts of cellulose and about 1000 parts of caustic soda solution of 25 per cent. strength (produced, for example, either by mixing 1000 parts of finely divided cellulose (wood pulp or cotton linters) with 1000 parts of caustic soda solution of 25 per cent. strength in a kneading machine or a shredder at about 10 to 14° C., or by impregnating 1000 parts of cellulose with an excess (for example 20,000 parts of caustic soda solution of 25 per cent. strength and pressing the alkali cellulose down to 2000 parts) are placed in a rotating autoclave, whereupon 500 parts of trichlorethylene are added. The autoclave is now closed and heated until the temperature of the reacting mass rises to 90 to 100° C. The reaction mass is kept at this temperature for about 3 to 4 hours, whereupon, after the autoclave has been cooled to room temperature, the reaction mass is washed on a filter, or a straining cloth or in a filter press with hot water until free from alkali. The washed and, if desired, pressed product which at least in part is soluble in caustic alkali solution (for example in caustic soda solution of 10 per cent. strength) may be either dried (if desired, after having been treated with alcohol and, if desired, with ether), or dissolved in caustic alkali solution of such strength as to yield a solution containing 4 to 8 per cent. of the dry residue of the washed and pressed product of the reaction and 8 to 10 per cent. of NaOH.

The product of the reaction may also be isolated from the reaction mass. For this purpose the crude or washed and pressed reaction mass is dissolved in about 75,000 parts of caustic soda solution of 5-8 per cent. strength, any insoluble material is removed by filtering, straining, centrifuging or the like, and the solution treated with a dilute acid, for instance sulphuric acid or acetic acid of 5-20 per cent. strength, until the product of the reaction has been completely precipitated. The substance which separates in flakes is then separated from the mother liquor by means of a filtering device (such as a filter press, strainer, filter or the like), washed with water until free from acid or salt and dried at atmospheric or reduced pressure, if necessary after previously dehydrating it with alcohol and washing with ether. After grinding, it forms a white powder, insoluble in water and in organic solvents, but soluble in dilute alkali, for instance, a caustic soda solution of 5-8 per cent. strength. A solution of the substance in caustic soda solution (for instance of 10 per cent. strength) is clear and viscous and, when spread on a glass plate and treated with a dilute acid or with any precipitating agent known in the viscose industry, yields a clear, tough film which, after washing and drying, is transparent and flexible.

*Example 2.*—Mode of procedure as in Example 1, but with the difference that, instead of 500 parts, 1000 to 2000 parts of trichlorethylene are employed.

*Example 3.*—The process is conducted as in Example 1 or 2, but with the difference that, instead of trichlorethylene, 500 to 2000 parts respectively of acetylenedichloride (symmetrical dichlorethylene ClHC:CHCl) are employed.

*Example 4.*—Mode of operation as in Example 1 or 2, but with the difference that, instead of trichlorethylene, 500 to 2000 parts respectively of monochlorethylene (vinyl chloride $H_2C:CHCl$) are employed.

The reactions taking place in the above examples, between the halogen-olefine and the alkali cellulose, produce ethers of a particular type, namely cellulose ethers of unsaturated alcohols. The reaction between alkali cellulose and vinyl chloride (Example 4) may be expressed thus (X— representing a cellulose residue):

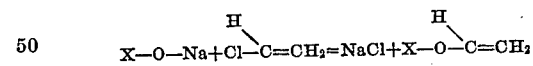

This latter is the cellulose vinyl ether. The products contain the characteristic grouping

The process may also be conducted in presence of a catalyzer, for example of a small quantity of a copper salt or iron salt or nickel salt or the like.

Instead of bleached or unbleached cellulose there may be used as parent material a conversion product of cellulose insoluble in alkali (for instance, a cellulose hydrated or cellulose hydrolyzed by a chemical action such as by mercerization with subsequent washing and, if necessary, drying, by the action of a strong mineral acid, by heating with a weak mineral acid, or by treatment with a zinc halide, or by a mechanical process such as grinding in the presence of water, or the like, or an oxycellulose insoluble in alkali) in short, any body of the cellulose group which has been proposed for the production of viscose or of ammoniacal copper-oxide-cellulose.

In the description and claims wherever the context permits the expression (cellulose) includes all bodies here mentioned belonging to the cellulose group.

Where feasible or desirable, instead of the chlorine-derivatives employed in the foregoing examples, the corresponding bromine or iodine derivatives may be used. I call attention to the fact that the "halogen olefines", as referred to herein are halogen substitution products of olefine hydrocarbons (as distinguished from di-halogen addition products or hydrohalogen addition products of olefines, or in other words halogen substitution products of saturated hydrocarbons). These products are characterized by containing an ethylene linkage

and of course are classified as unsaturated compounds. Thus trichlorethylene is

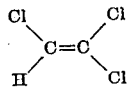

acetylene dichloride (or symmetrical dichlorethylene) is

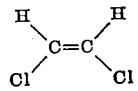

and monochlorethylene (or vinyl chloride) is

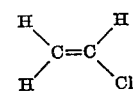

What I claim is:—

1. A process of making a new cellulose derivative, wherein cellulose is acted upon with a halogen substitution product of an olefine in which at least one halogen atom is linked to a double bond carbon atom, such reaction being effected in the presence of an alkali.

2. Process as in claim 1, in which the halogen is chlorine.

3. A process of making a new cellulose derivative, wherein cellulose is acted upon with a halogen compound containing an ethylene linkage to at least one carbon atom of which linkage, at least one halogen element is linked.

4. A process of making a new cellulose derivative, wherein cellulose is acted upon with a halogen compound selected from the herein described group consisting of trichlorethylene, acetylene dichloride and monochlorethylene, and the corresponding bromine and iodine compounds.

5. Process as in claim 1, in which the halogen substitution product is added while carried in an inert diluent.

6. A process as in claim 1, in which the reaction is effected by heating the materials, while being agitated together, to about 90-100° C.

7. A process of making a new cellulose derivative which comprises reacting upon an alkali cellulose containing about 50% cellulose, about 12.5% NaOH and about 37.5% water, with a halogen substitution product of an olefine in which at least one halogen atom is linked to a double bond carbon atom.

8. The herein described new cellulose derivatives which contain the reaction product of a halogen substitution product of an olefine in which at least one halogen atom is linked to a double bond carbon atom, with cellulose, which new derivatives are insoluble in water, insoluble in alcohol, ether and other common organic solvents, and insoluble in acids, but soluble in alkaline solutions to give viscous solutions which are precipitated by acids and by any of the usual precipitants for viscose.

9. A cellulose compound which contains a radical of a halogen substitution product of an olefine in which substitution product at least one halogen atom is linked to a double bond carbon atom.

10. A cellulose compound which contains a radical of a halogen-olefine selected from the group consisting of vinyl-halide, dihalogen-ethylene and trihalogen-ethylene.

11. A shaped material containing a coagulated reaction product of alkali cellulose and a halogen-olefine, which latter contains at least one halogen atom linked to a double bond carbon atom.

12. A shaped artificial material containing a cellulose compound which contains a radical of a halogen-olefine selected from the group consisting of vinyl-halide, dihalogen-ethylene and trihalogen-ethylene.

13. An ether of cellulose which, at least in its greater part, is soluble in aqueous caustic alkali solution but insoluble in water and which contains the hydrocarbon radical of a halogen substitution product of an olefine, in which substitution product at least one halogen atom is linked to a double bond carbon atom.

14. A cellulose compound which, at least in its greater part, is soluble in aqueous caustic alkali solution but insoluble in water and which contains a radical of a halogen-olefine selected from the group monohalogen-ethylene, dihalogen-ethylene and trihalogen-ethylene.

15. A shaped material which, at least in its greater part, is soluble in aqueous caustic alkali solution but insoluble in water and which contains in a coagulated state, a reaction product of alkali cellulose and a halogen-olefine in which at least one halogen atom is linked to a double bond carbon atom.

16. A shaped artificial structure, containing as a characteristic component thereof, a cellulose ether of an unsaturated alcohol, which ether contains an oxygen atom attached to a carbon atom directly connected by a double bond to another carbon atom.

17. A cellulose ether containing the characteristic grouping

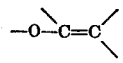

LEON LILIENFELD.